(12) United States Patent
Hong et al.

(10) Patent No.: US 11,333,921 B2
(45) Date of Patent: May 17, 2022

(54) DISPLAY DEVICE

(71) Applicant: InnoLux Corporation, Miao-Li County (TW)

(72) Inventors: Pei-Yuan Hong, Miao-Li County (TW); I-An Yao, Miao-Li County (TW); Po-Yang Chen, Miao-Li County (TW); Kuo-Jung Wu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/345,088

(22) Filed: Jun. 11, 2021

(65) Prior Publication Data

US 2022/0019106 A1 Jan. 20, 2022

(30) Foreign Application Priority Data

Jul. 16, 2020 (CN) .......................... 202010684694.0

(51) Int. Cl.
*G02F 1/1335* (2006.01)
*G02F 1/13357* (2006.01)
*G02F 1/1333* (2006.01)

(52) U.S. Cl.
CPC .... *G02F 1/133512* (2013.01); *G02F 1/13338* (2013.01); *G02F 1/133514* (2013.01); *G02F 1/133611* (2013.01)

(58) Field of Classification Search
CPC ........... G02F 1/133514; G02F 1/13312; G02F 1/13318; G02F 1/13338
See application file for complete search history.

(56) References Cited

U.S. PATENT DOCUMENTS

| 10,748,972 | B2 | 8/2020 | Chen et al. | |
|---|---|---|---|---|
| 2004/0119917 | A1 | 6/2004 | Lim | |
| 2008/0143936 | A1* | 6/2008 | Wang | G02F 1/133514 349/109 |
| 2008/0266491 | A1* | 10/2008 | Wang | G02F 1/133514 349/70 |
| 2010/0302223 | A1* | 12/2010 | Sakamoto | H01L 27/14632 345/207 |
| 2017/0139265 | A1* | 5/2017 | Kajita | G02F 1/133621 |

FOREIGN PATENT DOCUMENTS

| CN | 107024794 A | * | 8/2017 |
|---|---|---|---|
| CN | 108807489 A | | 11/2018 |

* cited by examiner

*Primary Examiner* — Jessica M Merlin
(74) *Attorney, Agent, or Firm* — McClure, Qualey & Rodack, LLP

(57) ABSTRACT

A display device is provided. The display device includes a display panel. The display panel includes a substrate, a light-shielding layer, and a plurality of optical sensors. The light-shielding layer has a plurality of first aperture regions, a plurality of second aperture regions, and a plurality of third aperture regions. The second aperture regions are located between the first aperture regions and the third aperture regions. At least a portion of at least one of the optical sensors overlaps with at least one of the first aperture regions in a normal direction of the substrate. An area of at least one of the second aperture regions is greater than an area of at least one of the first aperture regions, and the area of the at least one of the second aperture regions is smaller than an area of at least one of the third aperture regions.

18 Claims, 5 Drawing Sheets

DISPLAY DEVICE

CROSS REFERENCE TO RELATED APPLICATIONS

This application claims the benefit of China Application No. 202010684694.0, filed Jul. 16, 2020, the entirety of which is incorporated by reference herein.

BACKGROUND

Technical Field

The present disclosure is related to a display device, and in particular it is related to a display device that includes aperture regions that change gradually.

Description of the Related Art

Electronic products equipped with display panels, such as smartphones, tablet computers, notebook computers, displays, and televisions, have become indispensable necessities in modern society. With the flourishing development of these portable electronic products, consumers have high expectations regarding their quality, functionality, or price.

Although existing display devices have been adequate for their intended purposes, they have not been entirely satisfactory in all respects, e.g., they still have problems such as uneven brightness. For example, when fingerprint in display (FID) technology is integrated with a liquid-crystal display panel, disposal of the sensing element of the FID in some pixels will increase the size difference between the pixel aperture regions of the panel. Therefore, problems such as uneven brightness or inconsistent visual perception of the display panel may occur.

Accordingly, the development of a structural design that can improve the quality or performance of a display device is still an important research topic in the industry.

SUMMARY

In accordance with some embodiments of the present disclosure, a display device is provided. The display device includes a display panel. The display panel includes a substrate, a light-shielding layer, and a plurality of optical sensors. The light-shielding layer has a plurality of first aperture regions, a plurality of second aperture regions, and a plurality of third aperture regions. The second aperture regions are located between the first aperture regions and the third aperture regions. At least a portion of at least one of the optical sensors overlaps with at least one of the first aperture regions in a normal direction of the substrate. An area of at least one of the second aperture regions is greater than an area of at least one of the first aperture regions, and the area of the at least one of the second aperture regions is smaller than an area of at least one of the third aperture regions.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
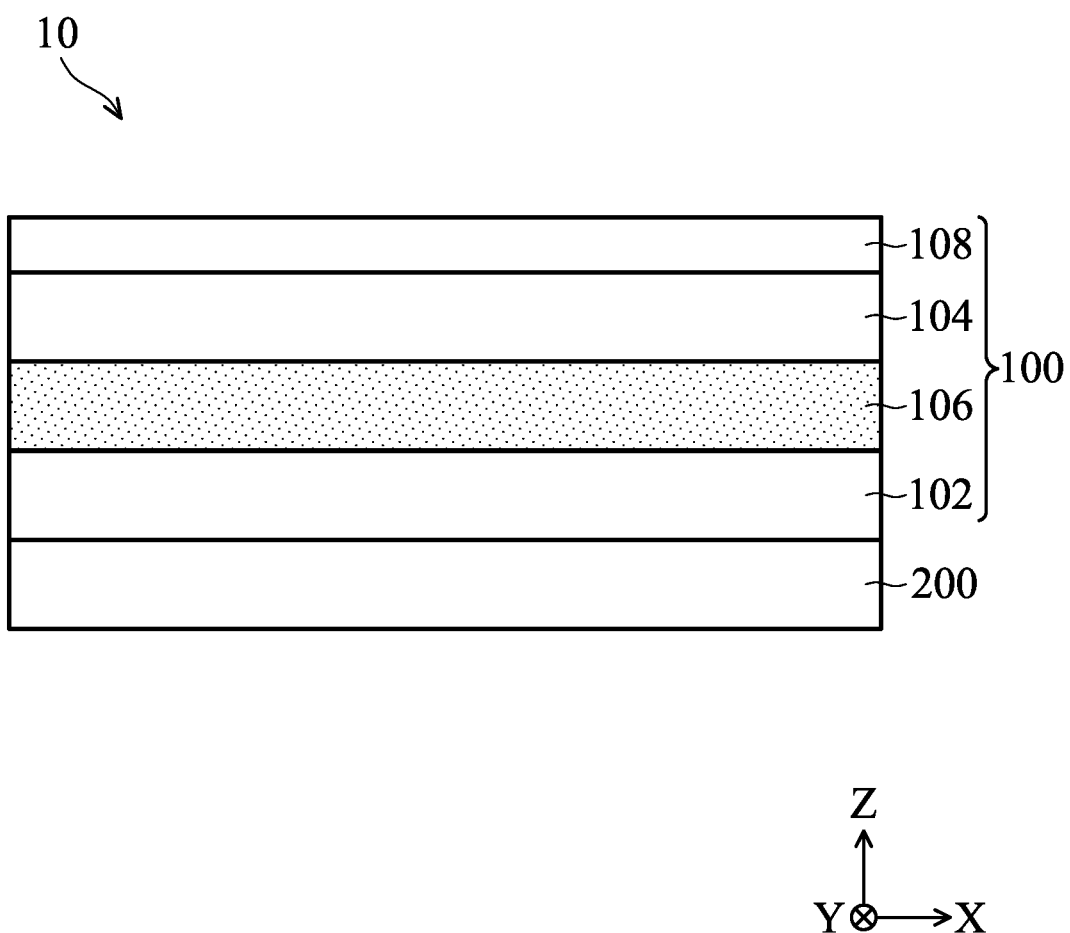
FIG. 1 is a schematic cross-sectional diagram of a display device in accordance with some embodiments of the present disclosure.

The display device of the present disclosure is described in detail in the following description. It should be understood that in the following detailed description, for purposes of explanation, numerous specific details and embodiments are set forth in order to provide a thorough understanding of the present disclosure. The elements and configurations described in the following detailed description are set forth in order to clearly describe the present disclosure. The embodiments are used merely for the purpose of illustration. In addition, different embodiments may use like and/or corresponding numerals to denote like and/or corresponding elements in order to clearly describe the present disclosure. However, the use of like and/or corresponding numerals of different embodiments does not suggest any correlation between different embodiments.

It should be understood that the elements or devices in the drawings of the present disclosure may be present in any form or configuration known to those skilled in the art. In addition, in the embodiments, relative expressions may be used. For example, "lower", "bottom", "higher" or "top" are used to describe the position of one element relative to another. It should be appreciated that if a device is flipped upside down, an element that is "lower" will become an element that is "higher". The present disclosure can be understood by referring to the following detailed description in connection with the accompanying drawings. The drawings are also regarded as part of the description of the present disclosure. It should be understood that the drawings of the present disclosure may be not drawn to scale. In fact, the size of the elements may be arbitrarily enlarged or reduced to clearly express the features of the present disclosure.

Moreover, the expressions such as "first material layer disposed on/over a second material layer", may indicate the direct contact of the first material layer and the second material layer, or it may indicate an indirect contact state with one or more intermediate layers between the first material layer and the second material layer. In the above situation, the first material layer may not be in direct contact with the second material layer.

In addition, it should be understood that the ordinal numbers used in the specification and claims, such as the terms "first", "second" etc., are used to modify an element, which itself does not mean and represent that the element (or elements) has any previous ordinal number, and does not mean the order of a certain element and another element, or the order in the manufacturing method. The use of these ordinal numbers is used to make a element with a certain name can be clearly distinguished from another element with the same name. The same words may not be used in the claims and the specification. Accordingly, the first element in the specification may be the second element in the claims.

The terms "about", "equal to", "the same as", "identical to", "substantially" or "approximately" are generally interpreted as being within 20% of a given value or range, or within 10%, 5%, 3%, 2%, 1% or 0.5% of the given value or range.

In the context, the terms "about" and "substantially" typically mean +/−10% of the stated value, or typically +/−5% of the stated value, or typically +/−3% of the stated value, or typically +/−2% of the stated value, or typically +/−1% of the stated value or typically +/−0.5% of the stated value. The stated value of the present disclosure is an approximate value. When there is no specific description, the stated value includes the meaning of "about" or "substantially". In addition, the term "in a range from the first value to the second value" means that the range includes the first value, the second value, and other values in between.

In the context, the length and the width of an element can be measured from an optical microscope image, and the thickness of the element can be measured from a cross-sectional image in an electron microscope, but it is not limited thereto.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

It should be noted that the following embodiments can replace, recombine, and combine features in several different embodiments to complete other embodiments without departing from the spirit of the present disclosure. The features between the various embodiments can be combined and used arbitrarily as long as they do not violate or conflict the spirit of the present disclosure.

In accordance with some embodiments of the present disclosure, a display device that includes a display panel with gradually changed aperture regions is provided. The problems such as uneven brightness of the display panel or inconsistent visual perception therefore can be improved. Specifically, in accordance with some embodiments of the present disclosure, the light-shielding layer of the display panel has apertures (corresponding, to the aperture regions of the pixels) with a gradually changing size, which can reduce the visual difference caused by different pixel aperture sizes. For example, in an example where the fingerprint in display (FID) element is integrated with the liquid-crystal display panel, the above configuration can reduce the problem that the brightness of the pixel corresponding to the FID sensor element is lower than the brightness of other pixels. The problem of uneven brightness of the display panel or inconsistent visual perception thereby can be improved. In accordance with some embodiments of the present disclosure, the visual effect of the display device also can be improved by adjustment of the brightness of the backlight module.

In accordance with some embodiments of the present disclosure, the display device may include a touch display device, a sensing display device, or a tiled display device, but it is not limited thereto. The display device may be a bendable or flexible display device. The display device may include, for example, light-emitting diode (LED), liquid crystal, fluorescence, phosphor, quantum dot (QD), another suitable material, or a combination thereof, but it is not limited thereto. The light-emitting diode may include, for example, organic light-emitting diode (OLED), inorganic light-emitting diode, mini light-emitting diode (mini LED), micro light-emitting diode (micro LED), quantum dot light-emitting diode (e.g., QLED or QDLED), another suitable material, or a combination thereof, hut it is not limited thereto. It should be understood that the liquid-crystal display device will be used as an example to describe the display device of the disclosure, but the present disclosure is not limited thereto.

Refer to FIG. 1, which is a schematic cross-sectional diagram of a display device 10 in accordance with some embodiments of the present disclosure. It should be understood that, for clear description, so elements of the display device 10 are omitted in the drawing, and only some elements of the display device 10 are shown schematically, and other elements will be described later. In accordance with some embodiments, additional features may be added to the display device 10 described below. In accordance with some other embodiments, some of the features of the display device 10 described below may be replaced or omitted.

As shown in FIG. 1, the display device 10 may include a display panel 100. In accordance with some embodiments, the display panel 100 may further include a substrate 102, a substrate 104, a display medium layer 106, and a cover substrate 108. The substrate 102 and the substrate 104 may be disposed opposite to each other, and the display medium layer 106 may be disposed between the substrate 102 and the substrate 104. The cover substrate 108 may be disposed on the substrate 104.

In accordance with some embodiments, the substrate 102 may serve as a driving substrate (or an array substrate), but the present disclosure is not limited thereto. In accordance with some embodiments, the display device 10 may include a driving circuit (not illustrated) disposed on or in the substrate 102, and the driving circuit may include an active driving circuit and/or a passive driving circuit. In accordance with some embodiments, the driving circuit may include transistors (for example, a switching transistor or a driving transistor, etc.), data lines, scan lines, conductive pads, dielectric layers or other cuts and so on, but it is not limited thereto. The switching transistor may be used to control the switching of the pixels. In accordance with some embodiments, the driving circuit may control the pixels of the display device 10 through an external integrated circuit (IC) or a microchip, but it is not limited thereto. In addition, in accordance with some embodiments, the substrate 102 may further include an electrode layer (not illustrated), and the electrode layer may be coupled to the aforementioned driving circuit.

In accordance with some embodiments, the substrate 104 may serve as a color filter substrate, but the present disclosure is not limited thereto. In accordance with some embodiments, the display device 10 may include a light-shielding layer and/or a color filter layer disposed on the substrate 104. The substrate 102, the substrate 104, and the elements formed therebetween will be described in detail in FIG. 4.

Furthermore, the substrate 102 and the substrate 104 may include a flexible substrate, a rigid substrate, or a combination thereof. In accordance with some embodiments, the materials of the substrate 102 and the substrate 104 may include glass, quartz, sapphire, ceramic, polyimide (PI), liquid-crystal polymer (LCP) material, polycarbonate (PC), photo sensitive polyimide (PSPI), polyethylene terephthalate (PET), another suitable material, or a combination thereof, but it is not limited thereto. In accordance with some embodiments, the substrate 102 and the substrate 104 may include a printed circuit board (PCB). In addition, the material of the substrate 102 may be the same as or different from the material of the substrate 104. Moreover, the light transmittance of the substrate 102 and the substrate 104 is not limited. That is, the substrate 102 and the substrate 104 may be a light-transmitting substrate, a semi-transmitting substrate, or a non-transmitting substrate.

In accordance with some embodiments, the display medium layer 106 may include a liquid-crystal material, or another suitable modulating material, but it is not limited thereto. The liquid-crystal material may include nematic liquid crystal, smectic liquid crystal, cholesteric liquid crystal, blue phase liquid crystal, another suitable liquid-crystal material, or a combination thereof. Furthermore, in accordance with some embodiments, the display device 10 may include a touch liquid-crystal display device. Alternatively, the display device 10 may include a twisted nematic (TN) type liquid-crystal display device, a super twisted nematic (STN) type liquid-crystal display device, a double layer super twisted nematic (DSTN) liquid-crystal display device, a vertical alignment (VA) liquid-crystal display device, an in-plane switching (IPS) liquid-crystal display device, a cholesteric liquid-crystal display device, a blue phase liquid-crystal display device, a fringe field switching (FFS) type liquid-crystal display device, another suitable liquid crystal display device, or a combination thereof.

In some embodiments where the display medium layer 106 includes a liquid-crystal material, the liquid-crystal layer may be formed by a one drop filling (ODF) process before the substrate 102 and the substrate 104 are assembled. Alternatively, the liquid-crystal materials may be filled by a vacuum injection method after the substrate 102 and the substrate 104 are assembled, but the present disclosure is not limited thereto.

In accordance with some embodiments, the cover substrate 108 may provide a surface for touch and operation, and protect the substrate 104, the display medium layer 106, and the substrate 102 underneath. In accordance with some embodiments, the material of the cover substrate 108 may include glass, quartz, sapphire, ceramic, another suitable material, or a combination thereof, but it is not limited thereto.

In addition, in accordance with some embodiments, the display device 10 may further include a backlight module 200, and the backlight module 200 is disposed corresponding to the display panel 100. Specifically, in accordance with some embodiments, the display panel 100 may at least partially overlap with the backlight module 200 in a normal direction (the Z direction shown in the drawing) of the substrate 102. The backlight module 200 may provide light sources to the display panel 100 in various manners. In accordance with some embodiments, the backlight module 200 may be a direct-lit backlight module. In accordance with some embodiments, the backlight module 200 may be an edge-lit backlight module.

In accordance with some embodiments, the backlight module 200 may include a light-emitting diode (LED), for example, an inorganic light-emitting diode (OLED), a mini light-emitting diode (mini LED), a micro light-emitting diode (micro LED) or quantum dot (QD) light-emitting diode (QLED or QDLED), fluorescence, phosphor, another suitable material, or a combination thereof, but it is not limited thereto.

Figure 2:
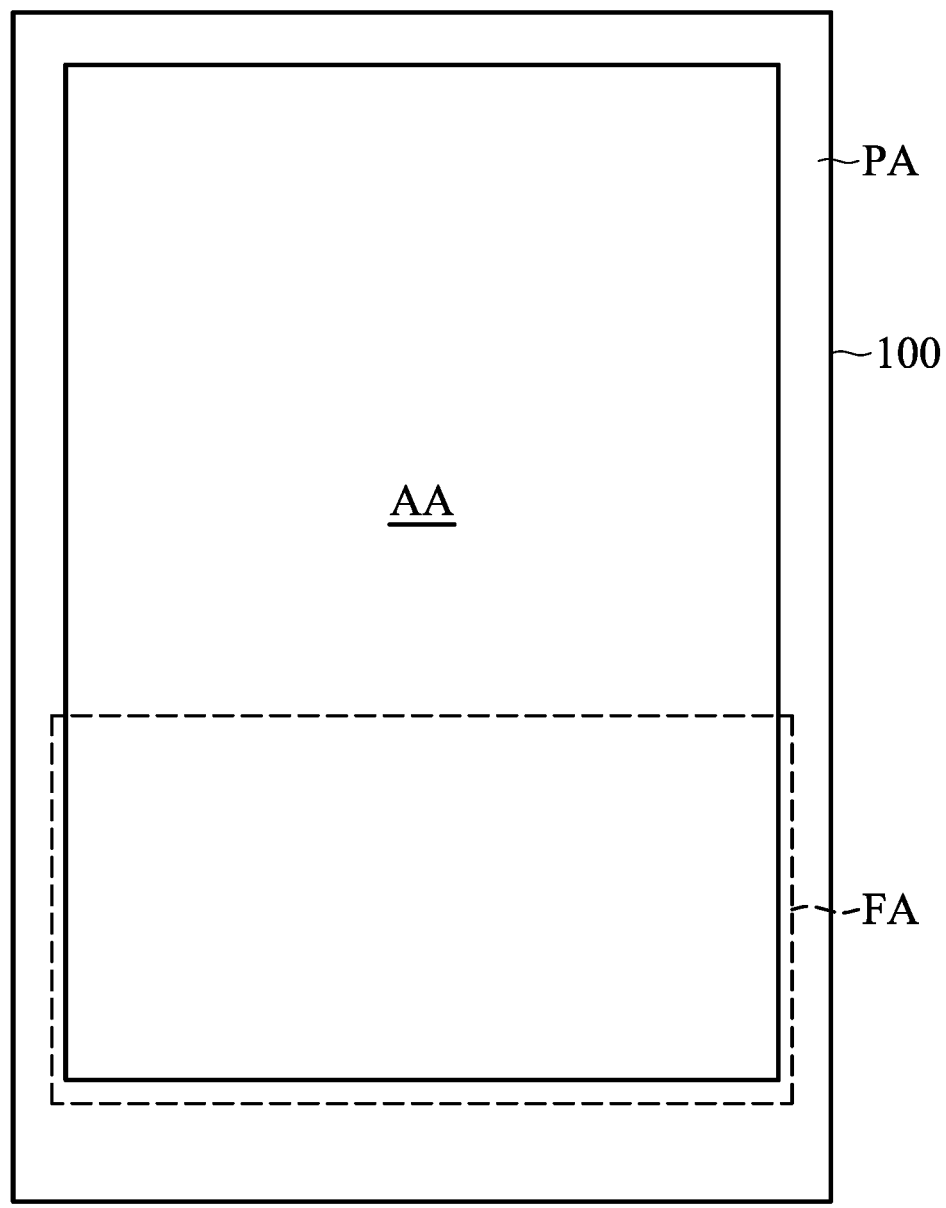
FIG. 2 is a schematic top-view diagram of a display device in accordance with some embodiments of the present disclosure.

Next, refer to FIG. 2, which is a schematic top-view diagram of the display device 10 in accordance with some embodiments of the present disclosure. FIG. 2 shows the relative positions of a display area AA, a non-display area PA and a fingerprint sensing area FA in the display panel 100 of the display device 10. In accordance with some embodiments, the non-display area PA may be located on the periphery and surround the display area AA, and the display area AA may include the fingerprint sensing area FA. Fingerprint recognition can be performed anywhere in the fingerprint sensing area FA.

In accordance with some embodiments, the fingerprint sensing area FA may partially overlap with the display area AA in the normal direction Z of the substrate 102. In accordance with some embodiments, the fingerprint sensing area FA may be disposed on a side close to the display area AA, for example, is disposed at the lower portion of the display area AA (as shown in FIG. 2), but the present disclosure is not limited thereto. Moreover, in some embodiments where the backlight module 200 (not labeled) is an edge-lit backlight module, the light incident side of the light source may be adjacent to the fingerprint sensing area FA. For example, the light source and the fingerprint sensing area FA may be located on the same side of the display device 10, but the present disclosure is not limited thereto. In other words, in accordance with some embodiments, the portion of the display area AA that overlaps with the fingerprint sensing area FA may be closer to the light incident side than other portions of the display area AA that do not overlap with the fingerprint sensing area FA.

Figure 3:
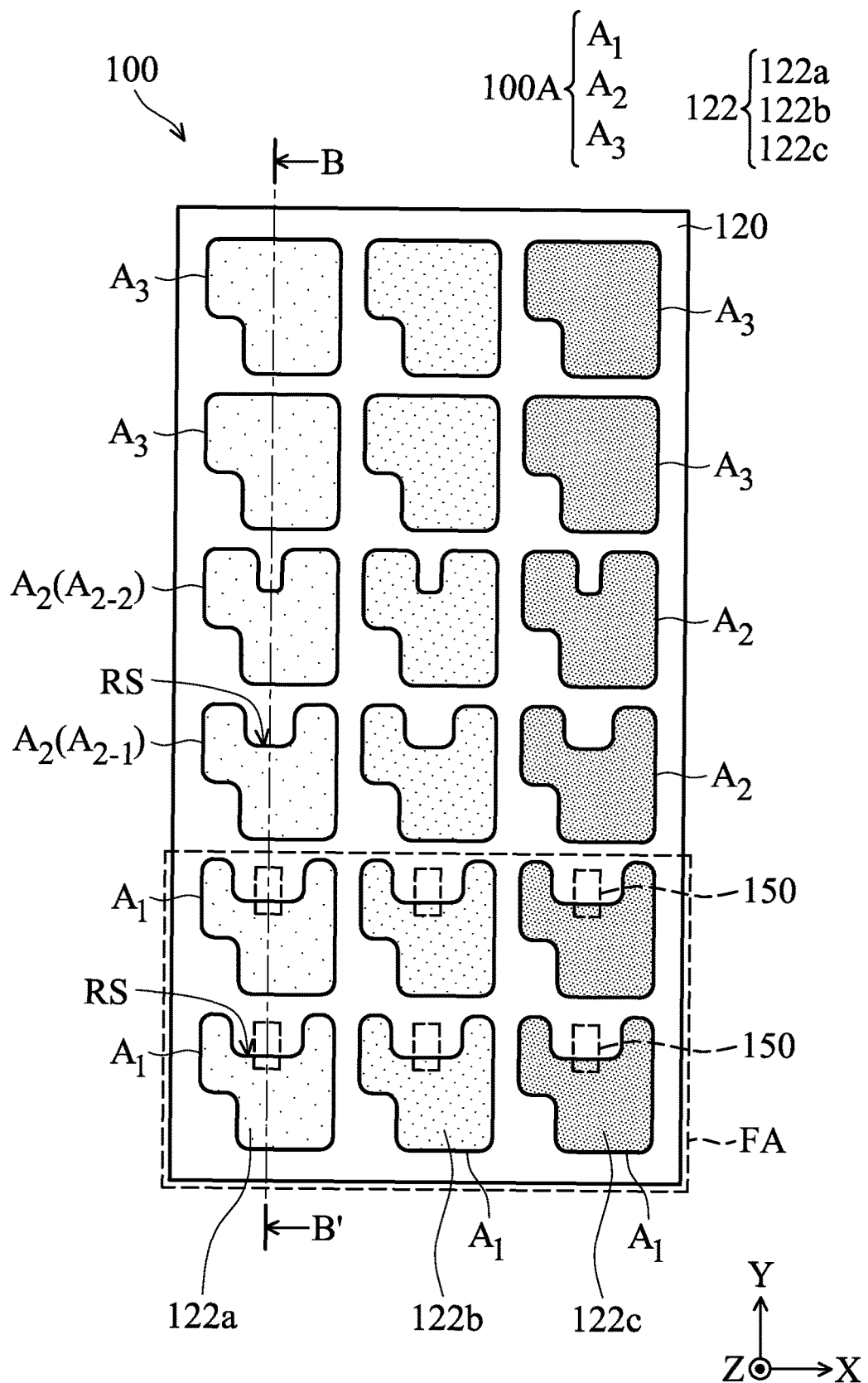
FIG. 3 is a schematic top-view diagram of some elements in a display device in accordance with some embodiments of the present disclosure.
Figure 4:
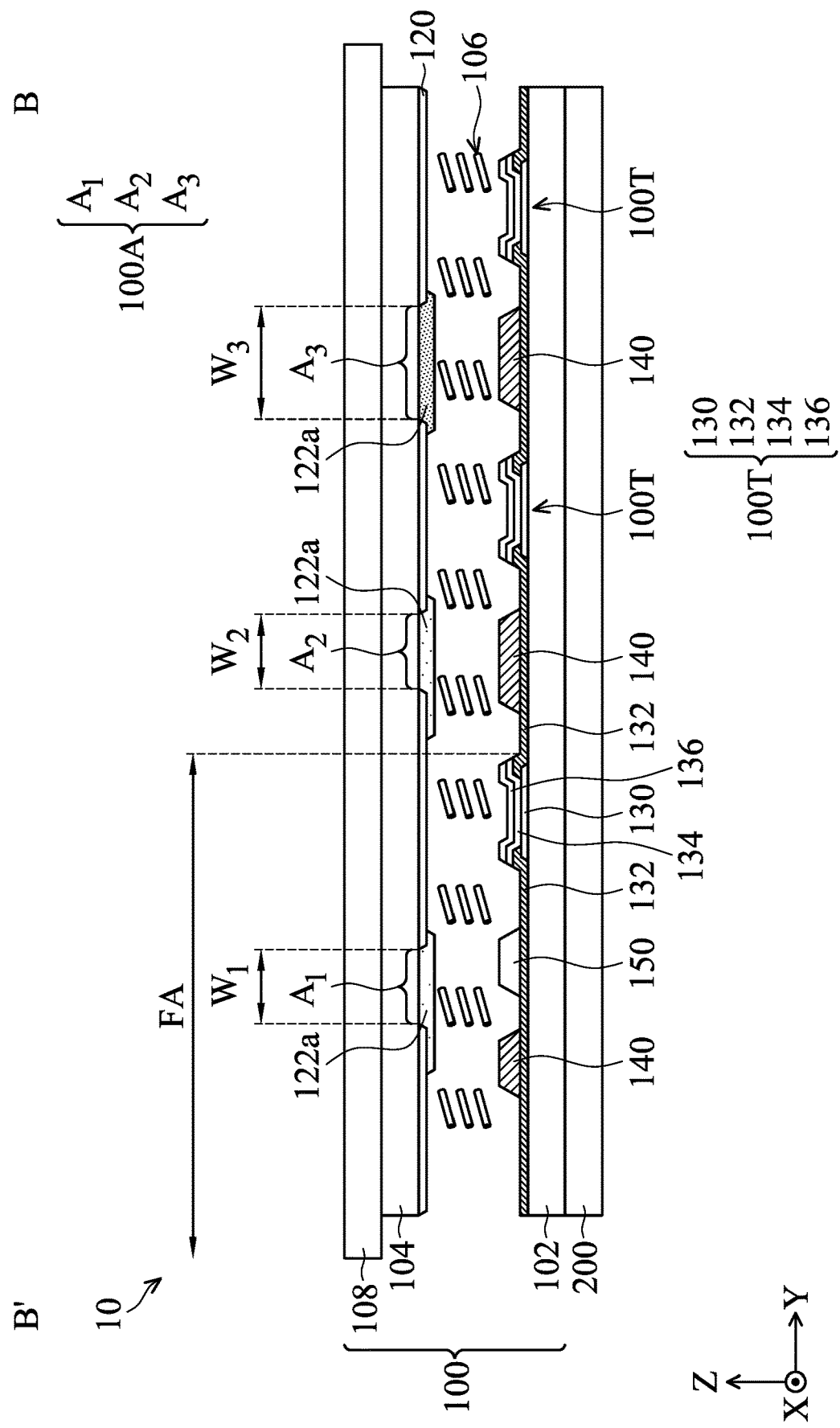
FIG. 4 is a schematic cross-sectional diagram of a display device taken along section line B-B' in FIG. 3 in accordance with some embodiments of the present disclosure.

Next, refer to FIG. 3 and FIG. 4. FIG. 3 is a schematic top-view diagram of some elements in the display device 10 in accordance with some embodiments of the present disclosure. FIG. 4 is a schematic cross-sectional diagram of the display device 10 taken along section line B-B' in FIG. 3 in accordance with some embodiments of the present disclosure. As shown in FIG. 3, in accordance with some embodiments, the display device 10 may include a light-shielding layer 120 and a color filter layer 122.

In accordance with some embodiments, the display panel 100 may include the light-shielding layer 120 and the color filter layer 122 that are disposed on the substrate 104 (as shown in FIG. 4). In accordance with some embodiments, as shown in FIG. 3, the light-shielding layer 120 may have a plurality of aperture regions 100A, and the color filter layer 122 may be filled in the aperture regions 100A.

Specifically, in accordance with some embodiments, the aperture regions 100A of the light-shielding layer 120 are the aperture regions of the pixels. It should be understood that, for clear description, the following description uses different reference numerals and ordinal numbers to indicate the aperture regions 100A located in different areas (for example, located in the fingerprint sensing area FA or located outside the fingerprint sensing area FA), or to indicate different aspects of aperture regions 100A.

In accordance with some embodiments, the aperture regions 100A may include a plurality of first aperture regions $A_1$, a plurality of second aperture regions $A_2$, and a plurality of third aperture regions $A_3$. The first aperture regions $A_1$, the second aperture regions $A_2$, and the third aperture regions $A_3$ may be disposed on the substrate 104, and the second aperture regions $A_2$ may be located between the first aperture regions $A_1$ and the third aperture regions $A_3$. In accordance with some embodiments, the areas of the first aperture region $A_1$, the second aperture region $A_2$, and the third aperture region $A_3$ are different from each other. In accordance with some embodiments, an area of at least one of the second aperture regions $A_2$ is larger than an area of at least one of the first aperture regions $A_1$, and the area of the at least one of the second aperture regions $A_2$ is smaller than an area of at least one of the third aperture regions $A_3$. In accordance with some embodiments, the areas of the second aperture regions $A_2$ all are larger than the areas of the first aperture regions $A_1$, and the areas of the second aperture regions $A_2$ all are smaller than the areas of the third aperture regions $A_3$, but it is not limited thereto.

In accordance with some embodiments, the first aperture regions $A_1$ may be located in the fingerprint sensing area FA. That is, the first aperture regions $A_1$ may overlap with the fingerprint sensing area FA in the normal direction Z of the substrate 102. In accordance with some embodiments, the second aperture regions $A_2$ and the third aperture regions $A_3$ may be located outside the fingerprint sensing area FA. In accordance with some embodiments, the second aperture regions $A_2$ may be closer to the fingerprint sensing area FA than the third aperture regions $A_3$. In accordance with some embodiments, the color filter layer 122 may overlap with the first aperture regions $A_1$, the second aperture regions $A_2$, and the third aperture regions $A_3$ in the normal direction Z of the substrate 102.

In addition, as shown in FIG. 3, in accordance with some embodiments, the display device 10 may include a plurality of optical sensors 150, and the optical sensors 150 may be located in the fingerprint sensing area FA. The optical sensors 150 can sense the touch of the finger and convert it electronic signal, and the electronic signal can be transmitted to the corresponding driving component or signal processing element for identification and analysis. In accordance with some embodiments, the pixel areas having the optical sensors 150 may substantially correspond to the fingerprint sensing area FA.

In accordance with some embodiments, at least a portion of at least one of the optical sensors 150 may overlap with at least one of the first aperture regions $A_1$ in the normal direction Z of the substrate 102. In accordance with some embodiments, one of the first aperture regions $A_1$ may overlap with one of the optical sensors 150, but it is not limited thereto. In accordance with some other embodiments, one of the first aperture regions $A_1$ may overlap with several optical sensors 150. In accordance with some embodiments, a portion of at least one of the optical sensors 150 may overlap with the color filter layer 122 in the normal direction Z of the substrate 102. Furthermore, in accordance with some embodiments, the optical sensor 150 may partially overlap with the color filter layer 122 and partially overlap with the light-shielding layer 120 in the normal direction Z of the substrate 102. In accordance with some embodiments, some of the pixel areas located in the fingerprint sensing area FA may include the optical sensor 150, and some of the pixel areas may not include the optical sensor 150. In other words, not all of the pixel areas located in the fingerprint sensing area FA include the optical sensor 150.

In accordance with some embodiments, the first aperture regions $A_1$ located in the fingerprint sensing area FA may all have substantially the same area, and the third aperture regions $A_3$ located farther from the fingerprint sensing area FA may all have substantially the same area. It should be noted that, in accordance with some embodiments, the second aperture regions $A_2$ are located between the first aperture regions $A_1$ and the third aperture regions $A_3$, and the area of each second aperture region $A_2$ may be between the area of the first aperture region $A_1$ and the area of the third aperture region $A_3$. In addition, the area of the second aperture regions $A_2$ may be gradually changed. That is, the second aperture regions $A_2$ may each have a different area, and the sizes of each of those areas may be gradually changed, but the embodiment is not limited thereto.

In accordance with some embodiments, with such aperture regions 100A having gradually changed areas, the visual difference caused by the first aperture regions $A_1$ and the third aperture regions $A_3$ of different sizes can be reduced. Problems such as uneven brightness or inconsistent visual perception of the display panel 100 can be solved.

Specifically, in accordance with some embodiments, along the direction from the first aperture region $A_1$ to the third aperture region $A_3$ (for example, the Y direction shown in the drawing) (or along the direction that is away from the fingerprint sensing area FA), the area of the second aperture regions $A_2$ may be gradually decreased. That is, the area of the color filter layer 122 that is exposed by the light-shielding layer 120 may be gradually decreased. For example, as shown in FIG. 3, the area of the second aperture region $A_{2-1}$ is smaller than the area of the second aperture region $A_{2-2}$, and the second aperture region $A_{2-1}$ is closer to the first aperture region $A_1$ (or fingerprint sensing area FA) than the second aperture region $A_{2-2}$.

Specifically, the second aperture regions $A_2$ lay be referred to as the gradually changed aperture regions of the display panel 100. The gradually changed aperture regions may be defined as the region between the aperture region whose area starts to be different from that of the first aperture region $A_1$ (for example, the second aperture region $A_{2-1}$ shown in the drawing) and the aperture region whose area starts to be different from that of the third aperture region $A_3$ (for example, the second aperture region $A_{2-2}$ shown in the drawing).

In accordance with some embodiments, a ratio of the area of the first aperture region $A_1$ to the area of the third aperture region $A_3$ may be between about 20% and about 70% (20%≤ratio≤70%), or between about 36% and about 56% (36%≤ratio≤56%). In accordance with some embodiments, a ratio of the area of the first aperture region $A_1$ to the area of the second aperture region $A_2$ may be between about 40% and about 85% (40%≤ratio≤85%), or between about 55% and about 75% (55%≤ratio≤75%). In accordance with some embodiments, a ratio of the area of the second aperture region $A_2$ to the area of the third aperture region $A_3$ may be between about 50% and about 85% (50%≤ratio≤85%), or between about 65% and about 80% (65%≤ratio≤80%). When the ratio of the areas between different aperture regions are designed to be within the above range, the display panel may have a more uniform brightness distribution.

In accordance with some embodiments, as shown in FIG. 3, by increasing the overlapping area of the light-shielding layer 120 and the color filter layer 122, the area of the aperture regions 100A may be reduced. That is, the area of the color filter layer 122 that is exposed by the light-shielding layer 120 may be reduced. In accordance with some embodiments, compared to the third aperture region $A_3$, the light-shielding layer 120, for example, may extend and protrude toward the aperture regions so that recesses RS may be formed in the first aperture region $A_1$ and the second aperture region $A_2$. In accordance with some embodiments, the optical sensor 150 may overlap with the recess RS of the first aperture region $A_1$ in the normal direction Z of the substrate 102.

However, it should be understood that although the area of the aperture regions 100A of the display panel 100 is reduced by extending the light-shielding layer 120 to form the recess RS in the illustrated embodiments, the way to decrease the area of the aperture regions is not limited thereto. In addition, the shape of the aperture regions 100A are not limited those shown in the drawing as well. In accordance with various embodiments, the aperture regions 100A may have another suitable shape.

Moreover, it should be understood that the quantity of aperture regions 100A shown in the drawings is merely fir illustration. In accordance with various embodiments, the display panel 100 may have another suitable quantity of aperture regions 100A (the first aperture regions $A_1$, the second aperture regions $A_2$ and the third aperture regions $A_3$).

Furthermore, in accordance with some embodiments, the light-shielding layer 120 may include a black matrix. The color filter layer 122 can filter or adjust the optical properties of the light passing through it, for example, to pass light of a specific wavelength range. In accordance with some embodiments, the display device 10 may include a plurality of scan lines (not illustrated) and a plurality of data lines (not illustrated), and the scan lines and the data lines may extend in directions substantially perpendicular to each other. The scan lines and the data lines may overlap with the light-shielding layer 120 in the normal direction Z of the substrate 102, but they are not limited thereto.

As shown in FIG. 3, in accordance with some embodiments, the color filter layer 122 may include a plurality of color filter units, for example, a color filter unit 122a, a color filter unit 122b, and a color filter unit 122c. For example, in accordance with some embodiments, the color filter unit 122a, the color filter unit 122b, and the color filter unit 122c may include a red filter unit, a green filter unit, and a blue filter unit, but the present disclosure is not limited thereto. In addition, it should be understood that although the color filter layer 122 includes three types of color filter units in the embodiment shown in the drawings, the color filter layer 122 may include another suitable number or other suitable colors of color filter unit in accordance with some other embodiments.

In accordance with some embodiments, the material of the light-shielding layer 120 may include black photoresist, black printing ink, black resin, metal, carbon black material, resin material, photosensitive material, another suitable material, or a combination thereof, but it is not limited thereto. In accordance with some embodiments, the material of the color filter layer 122 may include a color photoresist, and the material of the color photoresist may include, for example, a polymer material and pigments and photosensitive materials dispersed therein. In accordance with some embodiments, the aforementioned polymer material may include epoxy resin, acrylic resin such as polymethylmethacrylate (PMMA), benzocyclobutene (BCB), another suitable material, or a combination thereof, but it is not limited thereto.

In accordance with some embodiments, the light-shielding layer 120 and the color filter layer 122 may be formed by a coating process, a deposition process, a printing process, an evaporation process, a sputtering process, another suitable process, or a combination thereof.

In addition, in accordance with some embodiments, the light-shielding layer 120 and the color filter layer 122 may be patterned to have a suitable shape and profile by a photolithography process and/or an etching process. In accordance with some embodiments, the photolithography process may include photoresist coating (such as spin coating), soft baking, hard baking, mask alignment, exposure, post-exposure baking, photoresist development, cleaning and drying, etc., but it is not limited thereto. The etching process may include a dry etching process or a wet etching process, but it is not limited thereto.

In accordance with some embodiments, the optical sensor 150 may include a photodiode, or other elements that can convert optical signals to electrical signals, or a combination thereof.

Next, refer to FIG. 4, which further illustrates the configuration of the elements in the display device 10. It should be understood that, for clear description, FIG. 4 does not show all the aperture regions 100A corresponding to the section line B-B', but only shows one first aperture region $A_1$, one second aperture region $A_2$, and one third aperture region $A_3$. The first aperture region $A_1$, the second aperture region $A_2$, and the third aperture region $A_3$ that are not illustrated may have similar structures.

As shown in FIG. 4, in accordance with some embodiments, the display panel 100 of the display device 10 may further include a driving element 100T and a pixel electrode 140, and the driving element 100T and the pixel electrode 140 may be disposed on the substrate 102. In accordance with some embodiments, the driving element 100T may include a transistor, such as a switching transistor or a driving transistor. Specifically, the driving element 100T may include a semiconductor layer 130, a source/drain electrode layer 132, a gate dielectric layer 134 and a gate electrode layer 136. In accordance with some embodiments, the gate dielectric layer 134 and the gate electrode layer 136 may be disposed on the semiconductor layer 130, and the gate dielectric layer 134 may be disposed between the semiconductor layer 130 and the gate electrode layer 136. In addition, the gate electrode layer 136 may overlap with the semiconductor layer 130, and the source/drain electrode layer 132 may be disposed on both sides of the semiconductor layer 130, and overlap with portions on both sides of the semiconductor layer 130, respectively.

In accordance with some embodiments, the material of the semiconductor layer 130 may include elementary semiconductors, including silicon, or germanium; compound semiconductors, including gallium nitride (GaN), silicon carbide (SiC), gallium arsenide (GaAs), gallium phosphide (GaP), indium phosphide (InP), indium arsenide (InAs) and/or indium antimonide; alloy semiconductors, including silicon germanium (SiGe), gallium arsenide phosphide (GaAsP), aluminum indium arsenide (AlInAs), aluminum gallium arsenide (AlGaAs), gallium indium arsenide (GaInAs), gallium indium phosphide (GaInP) and/or gallium indium arsenide phosphide (GaInAsP), another suitable material, or a combination thereof, but it is not limited thereto.

In accordance with some embodiments, the material of the source/drain electrode layer 132 may include copper, aluminum, molybdenum, tungsten, gold, chromium, nickel, platinum, titanium, iridium, rhodium, copper alloy, aluminum alloy, molybdenum alloy, tungsten alloy, gold alloy, chromium alloy, nickel alloy, platinum alloy, titanium alloy, iridium alloy, rhodium alloy, another suitable conductive material, or a combination thereof, but it is not limited thereto.

In accordance with some embodiments, the material of the gate dielectric layer 134 may include silicon oxide, silicon nitride, silicon oxynitride, high-k dielectric material, another suitable dielectric material, or a combination thereof, but it is not limited thereto. The aforementioned high-k dielectric material may include metal oxide, metal nitride, metal silicide, transition metal oxide, transition metal nitride, transition metal suicide, metal oxynitride, metal aluminate, zirconium silicate, zirconium aluminate, or a combination thereof, but it is not limited thereto.

Furthermore, in accordance with some embodiments, the material of the gate electrode layer 136 may include amorphous silicon, polycrystalline silicon, one or more metals, metal nitride, conductive metal oxide, or a combination thereof, but it is not limited thereto. The aforementioned metal may include molybdenum, tungsten, titanium, tantalum, platinum, hafnium, or a combination thereof, but it is not limited thereto. The aforementioned metal nitride may include molybdenum nitride, tungsten nitride, titanium nitride, tantalum nitride, or a combination thereof, but it is not limited thereto.

In accordance with some embodiments, each layer of the driving element 100T may be formed by a physical vapor deposition (PVD) process, a chemical vapor deposition (CVD) process, a coating process, another suitable method, or a combination thereof. The aforementioned physical vapor deposition process may include, for example, a sputtering process, an evaporation process, or a pulsed laser deposition process. The aforementioned chemical vapor deposition process may include, for example, a low pressure chemical vapor deposition (LPCVD) process, a low temperature chemical vapor deposition (LTCVD) process, a rapid thermal chemical vapor deposition (RTCVD) process, a plasma enhanced chemical vapor deposition (PECVD) process, or an atomic layer deposition (ALD) process, etc.

In addition, it should be understood that, although the driving element 100T is a top gate thin-film transistor in the embodiment shown in FIG. 4, the driving element 100T may be a bottom gate thin-film transistor, a dual gate thin-film transistor, or a double gate thin-film transistor in accordance with some other embodiments.

Furthermore, the pixel electrode 140 may be electrically connected to the driving element 100T (e.g., the source/drain electrode layer 132), but it is not limited thereto. In accordance with some embodiments, the material of the pixel electrode 140 may include a metal conductive material, a transparent conductive material, another suitable material, or a combination thereof but it is not limited thereto. The metal conductive material may include copper, aluminum, tungsten, titanium, gold, platinum, nickel, copper alloy, aluminum alloy, tungsten alloy, titanium alloy, gold alloy, platinum alloy, nickel alloy, or a combination thereof, but it is not limited thereto. The transparent conductive material may include transparent conductive oxide (TCO). For example, the transparent conductive oxide may include indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO), or a combination thereof, but it is not limited thereto.

In addition, as described above, the optical sensor 150 may be disposed on the substrate 102 and located in the fingerprint sensing area FA. In accordance with some embodiments, the optical sensor 150 may be electrically connected to the driving element 100T (e.g., the source/drain electrode layer 132) and the pixel electrode 140, but it is not limited thereto. In accordance with some embodiments, the optical sensor 150 may at least partially overlap with the first aperture region $A_1$ in the normal direction Z of the substrate 102. In accordance with some embodiments, the optical sensor 150 may entirely overlap with the first aperture region $A_1$.

Furthermore, as described above, the light-shielding layer 120 and the color filter layer 122 (color filter unit 122a) may be disposed on the substrate 104 and located between the substrate 102 and the substrate 104. In accordance with some embodiments, the light-shielding layer 120 may be formed on the substrate 104 first, and then the color filter layer 122 may be formed on the substrate 104, but the present disclosure is not limited thereto. In accordance with some embodiments, in the normal direction Z of the substrate 102, the light-shielding layer 120 may partially overlap with the color filter layer 122. Furthermore, in accordance with some embodiments, the color filter layer 122 is not disposed on the substrate 104, but is disposed on the substrate 102. In accordance with some other embodiments, both the light-shielding layer 120 and the color filter layer 122 are disposed on the substrate 102.

In accordance with some embodiments, the color filter layer 122 (color filter unit 122a) disposed in the fingerprint sensing area FA has a width $W_1$ in the first aperture region $A_1$, the color filter layer 122 (color filter unit 122a) has a width $W_2$ in the second aperture region $A_2$, the color filter layer 122 (color filter unit 122a) has a width $W_3$ in the third aperture region $A_3$, and the width $W_3$ is greater than the width $W_2$, and the width $W_2$ is greater than the width $W_1$ (i.e. width $W_3$>width $W_2$>width $W_1$). In accordance with some embodiments, the width $W_1$, the width $W_2$ and the width $W_3$ can be obtained by respectively measuring the minimum width of the color filter layer 122 (color filter unit 122a) in the first aperture region $A_1$, the second aperture region $A_2$ and the third aperture region $A_3$ along the Y direction (as shown in FIG. 3).

Specifically, an optical microscope (OM) can be used to obtain images of the first aperture region $A_1$, the second aperture region $A_2$, and the third aperture region $A_3$ (similar to that shown in FIG. 3), and a virtual extension line in the Y direction that simultaneously passes through the recess RS of the first aperture region $A_1$, the recess RS of the second aperture region $A_2$, and the third aperture region $A_3$ is drawn. The width of the first aperture region $A_1$, the second aperture region $A_2$, and the third aperture region $A_3$ on the virtual extension line are then measured to obtain the width $W_1$, the width $W_2$ and the width $W_3$. In accordance with some other embodiments, if the gradually changed aperture regions are obtained by another design, the structural portions that result in the gradual difference can be measured to compare the width $W_1$, the width $W_2$, and the width $W_3$.

As shown in FIG. 4, in accordance with some embodiments, the display medium layer 106 may be disposed between the driving element 100T and the light-shielding layer 120, or the display medium layer 106 may be disposed between the driving element 100T and the color filter layer 122. In addition, in accordance with some embodiments, the display panel 100 may further include an alignment layer (not illustrated), spacer (not illustrated) and another structure. The alignment layer may be conformally disposed on the light-shielding layer 120, the color filter layer 122, the driving element 100T, the pixel electrode 140 and the optical sensor 150, but it is not limited thereto. The spacer may be disposed between the substrate 102 and the substrate 104.

The alignment layer may assist in controlling the material properties (for example, dielectric properties or arrangement direction, etc.) of the display medium layer 106, thereby controlling the display characteristics of the pixels of the display panel 100. In accordance with some embodiments, the material of the alignment layer may include an organic material, an inorganic material, or a combination thereof. For example, the organic material may include polyimide (PI), poly(vinyl cinnamate) (PVCN), polymethylmethacrylate (PMMA), another photoreactive polymer material, or a combination thereof, but it is not limited thereto. The inorganic material may include, for example, silicon dioxide (SiO$_2$), silicon carbide (SiC), glass, silicon nitride (Si$_3$N$_4$), aluminum oxide (Al$_2$O$_3$), cerium oxide (CeO$_2$), another inorganic material with alignment function, or a combination thereof, but it is not limited thereto. In accordance with some embodiments, the alignment lazes may be formed by a coating process, a chemical deposition process, a printing process, another suitable process, or a combination thereof.

Furthermore, the spacer may maintain the cell gap between the substrate 102 and the substrate 104 or may strengthen the structural strength of the display panel 100. In accordance with some embodiments, the material of the spacer may include an organic material. In accordance with some embodiments, the aforementioned organic material may include epoxy resin, acrylic resin such as polymethylmethacrylate (PMMA), benzocyclobutene (BCB), polyethylene terephthalate (PET), polyethylene (PE), polyethersulfone (PES), polycarbonate (PC), another suitable material, or a combination thereof, but it is not limited thereto. In accordance with some embodiments the spacer may be formed by a coating process, a deposition process, a printing process, another suitable process, or a combination thereof. In accordance with some embodiments, the spacer may be patterned by a photolithography process.

Moreover, the backlight module 200 may be disposed corresponding to the display panel 100. In accordance with some embodiments, the backlight module 200 may be disposed below the display panel 100. In addition, in accordance with some embodiments, the brightness of the backlight module 200 corresponding to at least one of the second aperture regions A$_2$ may be less than the brightness corresponding to at least one of the first aperture regions A$_1$, and the brightness of the backlight module 200 corresponding to at least one of the second aperture regions A$_2$ may be greater than the brightness corresponding to at least one of the third aperture regions A$_3$. In other words, in accordance with some embodiments, the brightness of the backlight module 200 may be changed as the areas of the aperture regions 100A are changed. For example, the brightness corresponding to the first aperture region A$_1$ with a smaller area may be greater than the brightness corresponding to the second aperture region A$_2$ or the third aperture region A$_3$ with larger areas. In addition, the brightness corresponding to the second aperture region A$_2$ with a smaller area may be greater than the brightness corresponding to third aperture region A$_3$ with a larger area.

In accordance with some embodiments, in the backlight module 200, a ratio of the brightness corresponding to the first aperture region A$_1$ to the brightness corresponding to the third aperture region A$_3$ may be between about 1.52 and about 2.81 (1.52≤ratio≤2.81), or between about 1.95 and about 2.38 (1.95≤ratio≤2.38). In accordance with some embodiments, in the backlight module 200, a ratio of the brightness corresponding to the first aperture region A$_1$ to the brightness corresponding to the second aperture region A$_2$ may be between about 1.11 and about 2.06 (1.11≤ratio≤2.06), or between about 1.42 and about 1.74 (1.42≤ratio≤1.74). In accordance with some embodiments, in the backlight module 200, a ratio of the brightness corresponding to the second aperture region A$_2$ to the brightness corresponding to the third aperture region A$_3$ may be between about 1.09 and about 1.64 (1.09≤ratio≤1.64), or between about 1.23 and about 1.50 (1.23≤ratio≤1.50). When the ratio of the brightness between different aperture regions are designed within the above range, the display panel may have a more uniform brightness distribution.

Figure 5:
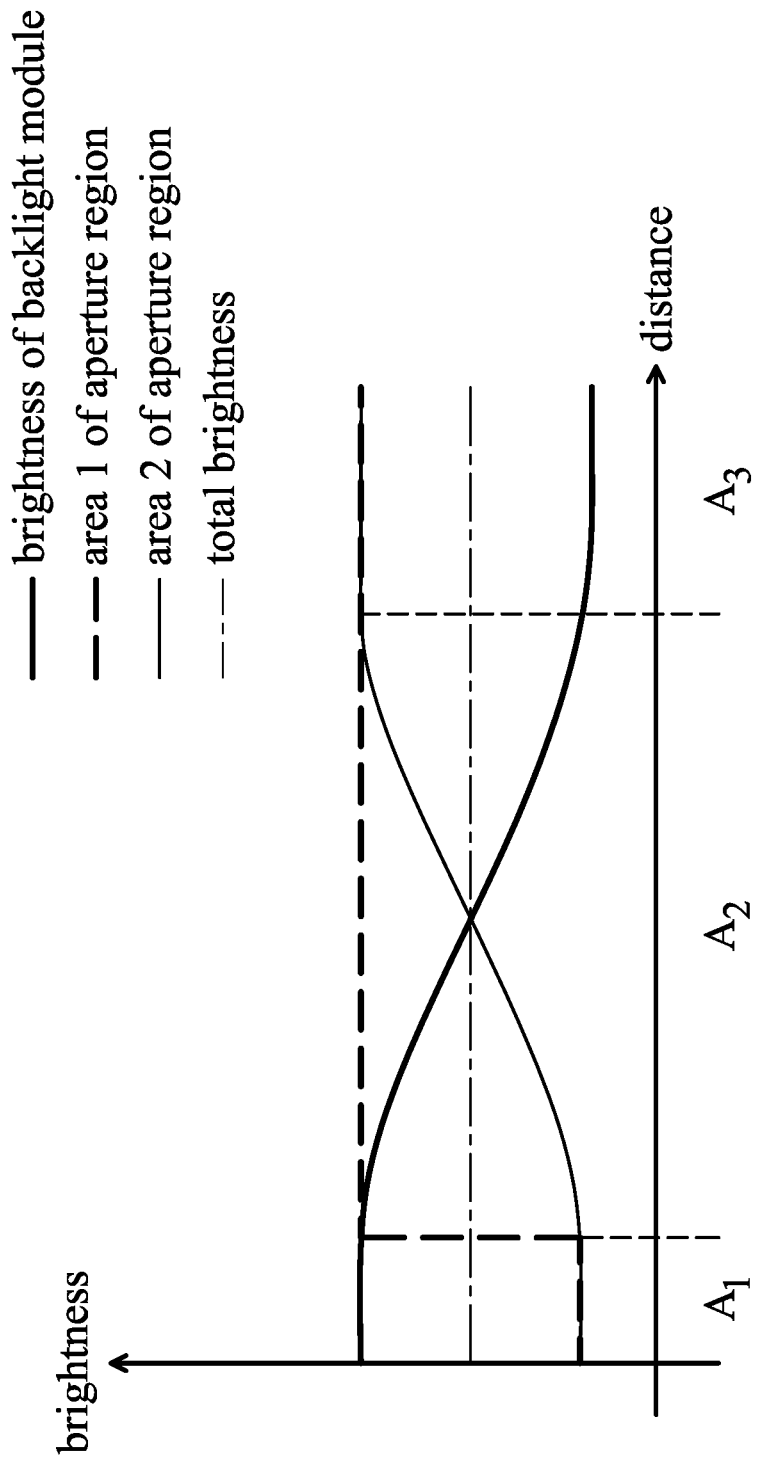
FIG. 5 is a diagram showing a brightness-distance relationship of an aperture region and a backlight module in a display device in accordance with some embodiments of the present disclosure.

Refer to FIG. 5, which is a diagram showing a brightness-distance relationship of an aperture region and a backlight module in a display device in accordance with some embodiments of the present disclosure. Specifically, FIG. 5 shows the brightness change of the backlight module, "area 1 of aperture region", and "area 2 of aperture region" as the distance from the light source is increased. The "area 1 of aperture region" refers to an example where the gradually changed apertures are not used, and the "area 2 of aperture region" refers to an example of using the gradually changed apertures according to the embodiments of the present disclosure.

As shown in FIG. 5, when the distance between the backlight module and the light source is increased, the brightness gradually decreased (for example, an edge-lit backlight module). When the distance between the "area 1 of aperture region" and the light source is increased, the brightness increased abruptly and greatly since the aperture region of the pixels suddenly increased in the area without the fingerprint sensing area. When the distance between the "area 2 of aperture region" and the light source is increased, the brightness increased slowly from a position with the fingerprint sensing area (for example, the first aperture region A$_1$) to a position without the fingerprint sensing area (for example, the third aperture region A$_3$), since the pixels have gradually changed apertures (e.g., the second aperture regions A$_2$). Such a configuration combined with the backlight module having a gradually decreasing brightness, an almost uniform total brightness can be obtained. That is, the brightness of the display panel is uniform. In some other embodiments, a direct-lit backlight module can also be used and combined with the design of areas of aperture regions or the position of the fingerprint sensing area to adjust the brightness of the light source in different areas, and thereby achieving the desired optical effect.

To summarize the above, in accordance with some embodiments of the present disclosure, the display device includes the display panel with aperture regions that change gradually. The problems such as uneven brightness of the display panel or inconsistent visual perception therefore can be improved. In accordance with some embodiments of the present disclosure, the visual effect of the display device also can be improved by adjustment of the brightness of the backlight module. In accordance with some embodiments of the present disclosure, the brightness uniformly of the display device including a fingerprint in display (FID) element can be effectively improved.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. A display device, comprising:
a display panel, the display panel comprising:
a substrate;
a light-shielding layer disposed on the substrate, the light-shielding layer having a plurality of first aperture regions, a plurality of second aperture regions, and a plurality of third aperture regions, wherein the plurality of second aperture regions are located between the plurality of first aperture regions and the plurality of third aperture regions;
a color filter layer disposed on the substrate, and the color filter layer fills in the plurality of first aperture regions, the plurality of second aperture regions, and the plurality of third aperture regions; and
a plurality of optical sensors, wherein at least a portion of at least one of the plurality of optical sensors overlaps with at least one of the plurality of first aperture regions in a normal direction of the substrate;
wherein, an area of at least one of the plurality of second aperture regions is larger than an area of at least one of the plurality of first aperture regions, and the area of the at least one of the plurality of second aperture regions is smaller than an area of at least one of the plurality of third aperture regions;
wherein, at least one of the plurality of optical sensors partially overlaps with the color filter layer and partially overlap with the light-shielding layer in the normal direction of the substrate.

2. The display device as claimed in claim 1, further comprising:
a backlight module disposed corresponding to the display panel.

3. The display device as claimed in claim 2, wherein a brightness of the backlight module corresponding to the at least one of the plurality of second aperture regions is smaller than a brightness of the backlight module corresponding to the at least one of the plurality of first apertures, and the brightness of the backlight module corresponding to the at least one of the plurality of second aperture regions is greater than a brightness of the backlight module corresponding to the at least one of the plurality of third aperture regions.

4. The display device as claimed in claim 1, wherein the display panel is a liquid-crystal display panel.

5. The display device as claimed claim 1, wherein the backlight module is a direct-lit backlight module.

6. The display device as claimed in claim 1, wherein the backlight module is an edge-lit backlight module.

7. The display device as claimed in claim 1, wherein at least a portion of at least one of the plurality of optical sensors overlaps with the color filter layer in the normal direction of the substrate.

8. The display device as claimed in claim 1, wherein the plurality of first aperture regions overlap with a fingerprint sensing area of the display device in the normal direction of the substrate.

9. The display device as claimed in claim 1, wherein an area of one of the plurality of second aperture regions is smaller than an area of another of the plurality of second aperture regions, and the one of the plurality of second aperture regions is closer to the plurality of first aperture regions than another of the plurality of second aperture regions.

10. The display device as claimed in claim 1, wherein areas of the plurality of second aperture regions all are larger than areas of the plurality of first aperture regions, and the areas of the plurality of second aperture regions all are smaller than areas of the plurality of third aperture regions.

11. The display device as claimed in claim 1, wherein the plurality of first aperture regions all have substantially the same area.

12. The display device as claimed in claim 1, wherein the plurality of third aperture regions all have substantially the same area.

13. The display device as claimed in claim 1, wherein a ratio of the area of the at least one of the plurality of first aperture regions to the area of the at least one of the plurality of third aperture regions is between 20% and 70%.

14. The display device as claimed in claim 1, wherein a ratio of the area of the at least one of the plurality of first aperture regions to the area of the at least one of the plurality of second aperture regions is between 40% and 85%.

15. The display device as claimed in claim 1, wherein a ratio of the area of the at least one of the plurality of second aperture regions to the area of the at least one of the plurality of third aperture regions is between 50% and 85%.

16. The display device as claimed in claim 1, wherein the light-shielding layer extend and protrude toward the at least one of the plurality of second aperture regions to form a recess in the at least one of the plurality of second aperture regions.

17. The display device as claimed in claim 1, wherein the color filter layer has a first width in the at least one of the plurality of first aperture region, the color filter layer has a second width in the at least one of the plurality of second aperture region, the color filter layer has a third width in the at least one of the plurality of third aperture region, and wherein the third width is greater than the second width, and the second width is greater than the first width.

18. The display device as claimed in claim 1, wherein the display panel further comprises:
a display medium layer disposed between the substrate and the light-shielding layer.

* * * * *